United States Patent
Berestov et al.

(10) Patent No.: US 7,333,652 B2
(45) Date of Patent: Feb. 19, 2008

(54) SYSTEM AND METHOD FOR EFFICIENTLY PERFORMING A DEPTH MAP RECOVERY PROCEDURE

(75) Inventors: Alexander Berestov, San Jose, CA (US); Earl Wong, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 224 days.

(21) Appl. No.: 10/910,098

(22) Filed: Aug. 3, 2004

(65) Prior Publication Data

US 2006/0029270 A1    Feb. 9, 2006

(51) Int. Cl.
*G06K 9/00* (2006.01)
(52) U.S. Cl. ............................. 382/154; 382/106
(58) Field of Classification Search ................ 382/106; 348/49
See application file for complete search history.

(56) References Cited

U.S. PATENT DOCUMENTS

| | | | |
|---|---|---|---|
| 4,947,347 A | 8/1990 | Sato ............................. 345/421 |
| 4,965,840 A | 10/1990 | Subbarao | |
| 5,148,209 A | 9/1992 | Subbarao | |
| 5,365,597 A | 11/1994 | Holeva | |
| 5,577,130 A * | 11/1996 | Wu ............................. 382/106 |
| 5,604,537 A | 2/1997 | Yamazaki et al. | |
| 5,663,781 A * | 9/1997 | Wilms et al. ................. 351/206 |
| 5,937,079 A * | 8/1999 | Franke ........................ 382/103 |
| 6,683,652 B1 | 1/2004 | Ohkawara et al. | |
| 6,876,776 B2 | 4/2005 | Recht | |
| 6,891,966 B2 * | 5/2005 | Chen ............................ 382/145 |
| 6,925,210 B2 | 8/2005 | Herf | |
| 7,019,780 B1 * | 3/2006 | Takeuchi et al. ............. 348/340 |
| 7,035,451 B2 * | 4/2006 | Harman et al. ............... 382/154 |
| 2003/0152263 A1 * | 8/2003 | Kawano et al. ............... 382/154 |
| 2003/0231792 A1 * | 12/2003 | Zhang et al. .................. 382/154 |
| 2004/0027450 A1 * | 2/2004 | Yoshino ........................ 348/42 |
| 2005/0104969 A1 | 5/2005 | Schoelkopf et al. | |

OTHER PUBLICATIONS

Eugene Hecht, Optics 3rd Edition, Nov. 1997, p. 126, Addison-Wesley, Chapter 4 (The Propagation of Light).
Tony Lindeberg, Scale-Space Theory in Computer Vision, 1994, pp. 1-423, Royal Institute of Technology Stockholm, Sweden, Kluwer Academic Publishers.
Berthold Klaus Paul Horn, Robot Vision, Mar. 1986, pp. 1-509, MIT Press-McGraw-Hill Book Company, New York.

* cited by examiner

*Primary Examiner*—Matthew C. Bella
*Assistant Examiner*—Alex Liew
(74) *Attorney, Agent, or Firm*—Gregory J. Koerner; Redwood Patent Law

(57) ABSTRACT

A system and method for efficiently performing a depth map recovery procedure includes an imaging device that is implemented in a single-lens stereo-shutter configuration for simultaneously capturing overlaid images corresponding to a photographic target. A depth map generator is configured to analyze the overlaid images to determine disparity values corresponding to separation distances between matching points in the overlaid images. The depth map generator then utilizes the disparity values to calculate depth values that correspond to locations in the photographic target. The depth map generator may then utilize the foregoing depth values for creating a depth map corresponding to the photographic target.

2 Claims, 9 Drawing Sheets

SYSTEM AND METHOD FOR EFFICIENTLY PERFORMING A DEPTH MAP RECOVERY PROCEDURE

BACKGROUND SECTION

1. Field of the Invention

This invention relates generally to techniques for analyzing image data, and relates more particularly to a system and method for efficiently performing a depth map recovery procedure.

2. Description of the Background Art

Implementing efficient methods for analyzing image data is a significant consideration for designers and manufacturers of contemporary electronic devices. However, efficiently analyzing image data with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively analyzes digital image data may benefit from an effective implementation because of the large amount and complexity of the digital data involved.

Due to growing demands on system resources and substantially increasing data magnitudes, it is apparent that developing new techniques for analyzing image data is a matter of concern for related electronic technologies. Therefore, for all the foregoing reasons, developing effective systems for analyzing image data remains a significant consideration for designers, manufacturers, and users of contemporary electronic devices.

SUMMARY

In accordance with the present invention, a system and method are disclosed for efficiently performing a depth map recovery procedure. In one embodiment, a depth map generator or any other appropriate entity may initially enable a depth map mode in a camera device. A capture subsystem of the camera device may responsively engage a single-lens stereo-shutter configuration by utilizing any effective techniques. The camera device may then simultaneously capture overlaid images corresponding to a selected photographic target. Next, the depth map generator may perform a matching procedure to determine corresponding matching points in the overlaid images.

The depth map generator may calculate disparity values corresponding to various pairs of the matching points from the overlaid images. Finally, the depth map generator may calculate individual depth values by utilizing the disparity values to thereby define a depth map corresponding to the selected photographic target. In certain embodiments, an auto-focus module may then utilize the depth map to perform an auto-focus procedure before the camera device captures and stores one or more final images.

In various alternate embodiments, the depth map may be utilized in any other appropriate and effective manner. For example, in certain embodiments of the present invention, the depth map may be utilized for various types of machine vision or object tracking applications. The present invention therefore provides an improved system and method for effectively and efficiently performing a depth map recovery procedure.

DETAILED DESCRIPTION

The present invention relates to an improvement in data analysis techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for efficiently performing a depth map recovery procedure, and includes an imaging device that is implemented in a single-lens stereo-shutter configuration for simultaneously capturing overlaid images corresponding to a photographic target. A depth map generator is configured to analyze the overlaid images to determine disparity values corresponding to separation distances between matching points in the overlaid images. The depth map generator then utilizes the disparity values to calculate depth values that correspond to locations in the photographic target. The depth map generator may then utilize the foregoing depth values for creating a depth map corresponding to the photographic target.

Figure 1:
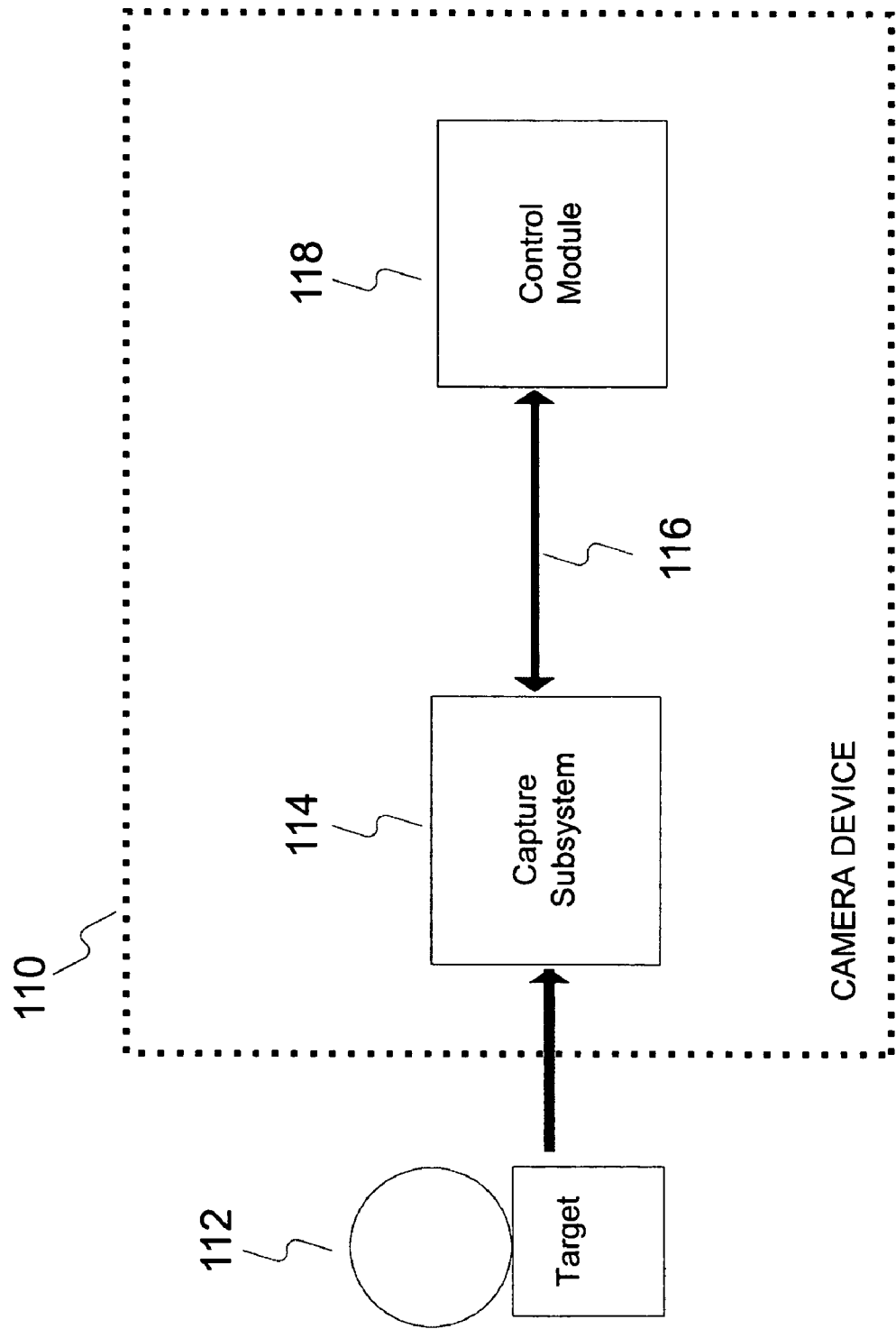
FIG. 1 is a block diagram for one embodiment of a camera device, in accordance with the present invention.

Referring now to FIG. 1, a block diagram for one embodiment of a camera device 110 is shown, in accordance with the present invention. In the FIG. 1 embodiment, camera device 110 may include, but is not limited to, a capture subsystem 114, a system bus 116, and a control module 118. In the FIG. 1 embodiment, capture subsystem 114 may be optically coupled to a photographic target 112, and may also be electrically coupled via system bus 116 to control module 118.

In alternate embodiments, camera device 110 may readily include various other components in addition to, or instead of, those components discussed in conjunction with the FIG. 1 embodiment. In addition, in certain embodiments, the present invention may alternately be embodied in any appropriate type of electronic device other than the camera device 110 of FIG. 1. For example, camera device 110 may alternately be implemented as an imaging device, a computer device, or a consumer electronics device.

In the FIG. 1 embodiment, once a system user has focused capture subsystem 114 on target 112 and requested camera device 110 to capture image data corresponding to target 112, then control module 118 may preferably instruct capture subsystem 114 via system bus 116 to capture image data representing target 112. The captured image data may then be transferred over system bus 116 to control module 118, which may responsively perform various processes and functions with the image data. System bus 116 may also bi-directionally pass various status and control signals between capture subsystem 114 and control module 118.

Figure 2:
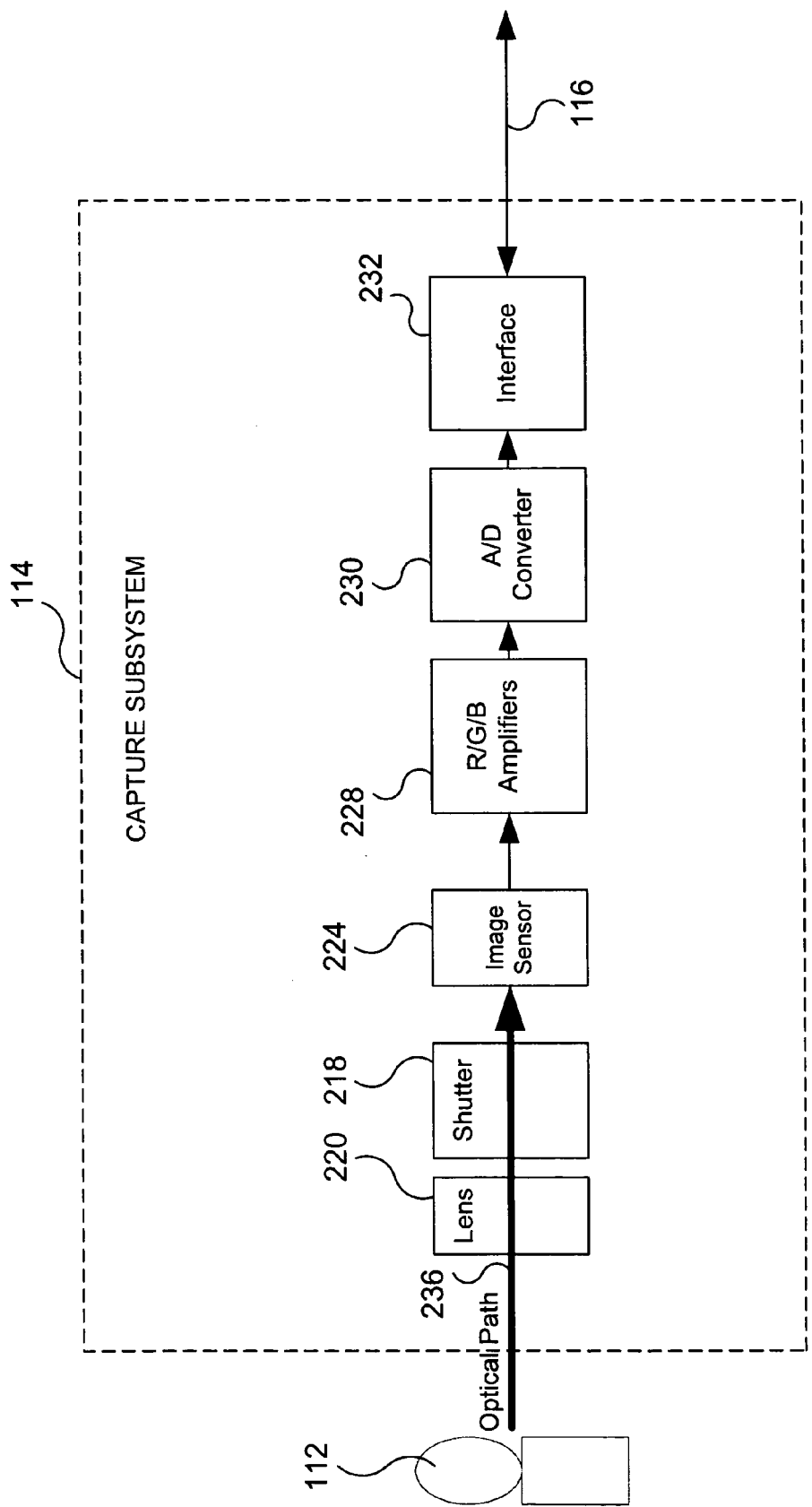
FIG. 2 is a block diagram for one embodiment of the capture subsystem of FIG. 1, in accordance with the present invention.

Referring now to FIG. 2, a block diagram for one embodiment of the FIG. 1 capture subsystem 114 is shown, in accordance with the present invention. In the FIG. 2 embodiment, capture subsystem 114 preferably comprises, but is not limited to, a shutter 218, a lens 220, an image sensor 224, red, green, and blue (R/G/B) amplifiers 228, an analog-to-digital (A/D) converter 230, and an interface 232. In alternate embodiments, capture subsystem 114 may readily include various other components in addition to, or instead of, those components discussed in conjunction with the FIG. 2 embodiment.

In the FIG. 2 embodiment, capture subsystem 114 may preferably capture image data corresponding to target 112 via reflected light impacting image sensor 224 along optical path 236. Image sensor 224, which may preferably include a charged-coupled device (CCD), may responsively generate a set of image data representing the target 112. The image data may then be routed through red, green, and blue amplifiers 228, A/D converter 230, and interface 232. From interface 232, the image data passes over system bus 116 to control module 118 for appropriate processing and storage. Other types of image capture sensors, such as CMOS or linear arrays are also contemplated for capturing image data in conjunction with the present invention. The utilization and functionality of shutter 218 is further discussed below in conjunction with FIGS. 5-9.

Figure 3:
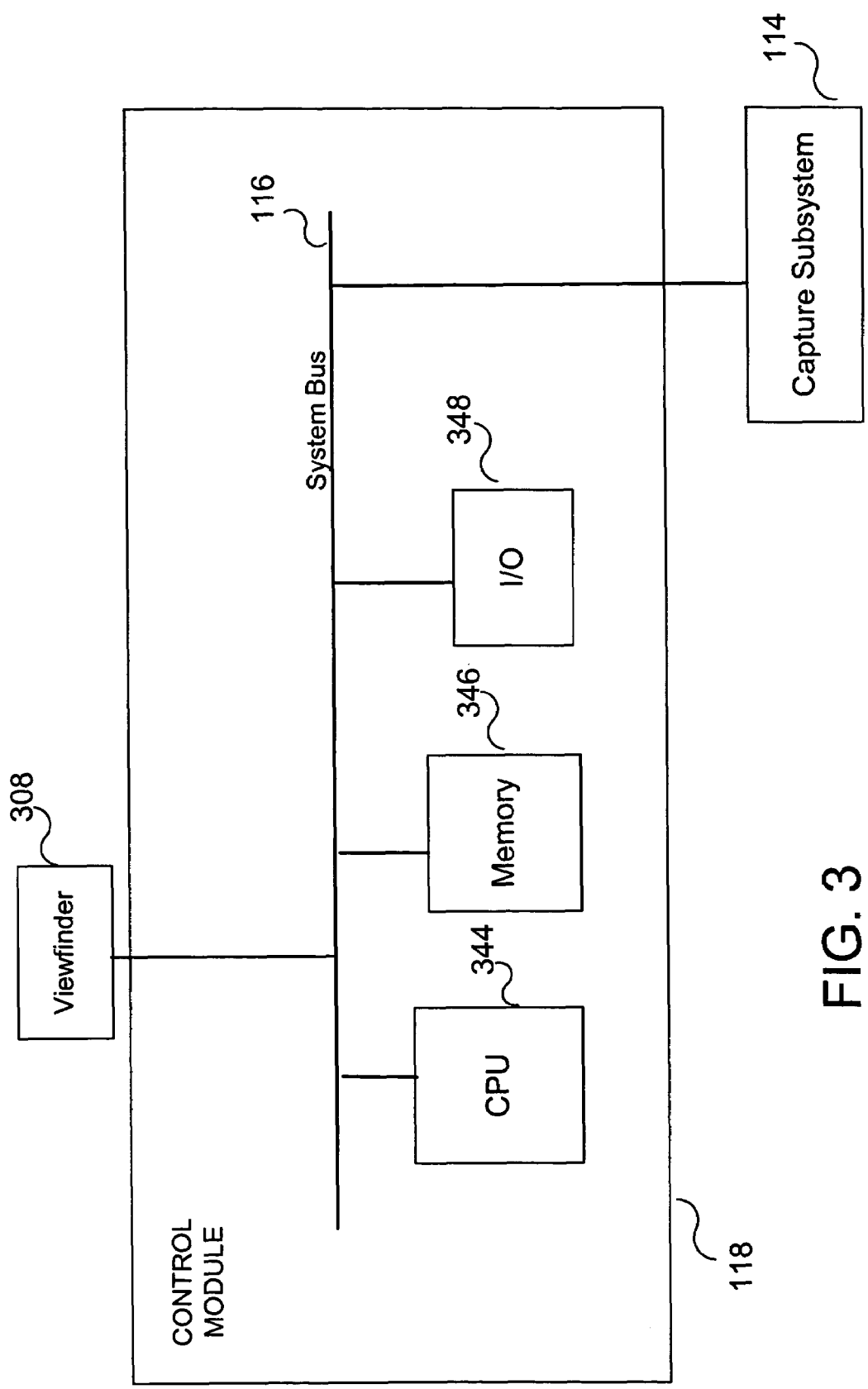
FIG. 3 is a block diagram for one embodiment of the control module of FIG. 1, in accordance with the present invention.

Referring now to FIG. 3, a block diagram for one embodiment of the FIG. 1 control module 118 is shown, in accordance with the present invention. In the FIG. 3 embodiment, control module 118 preferably includes, but is not limited to, a viewfinder 308, a central processing unit (CPU) 344, a memory 346, and one or more input/output interface(s) (I/O) 348. Viewfinder 308, CPU 344, memory 346, and I/O 348 preferably are each coupled to, and communicate, via common system bus 116 that also communicates with capture subsystem 114. In alternate embodiments, control module 118 may readily include various other components in addition to, or instead of, those components discussed in conjunction with the FIG. 3 embodiment.

In the FIG. 3 embodiment, CPU 344 may be implemented to include any appropriate microprocessor device. Alternately, CPU 344 may be implemented using any other appropriate technology. For example, CPU 344 may be implemented to include certain application-specific integrated circuits (ASICs) or other appropriate electronic devices. Memory 346 may be implemented as one or more appropriate storage devices, including, but not limited to, read-only memory, random-access memory, and various types of non-volatile memory, such as floppy disc devices, hard disc devices, or flash memory. I/O 348 may provide one or more effective interfaces for facilitating bi-directional communications between camera device 110 and any external entity, including a system user or another electronic device. I/O 348 may be implemented using any appropriate input and/or output devices. The operation and utilization of control module 118 are further discussed below in conjunction with FIGS. 4 through 9.

Figure 4:
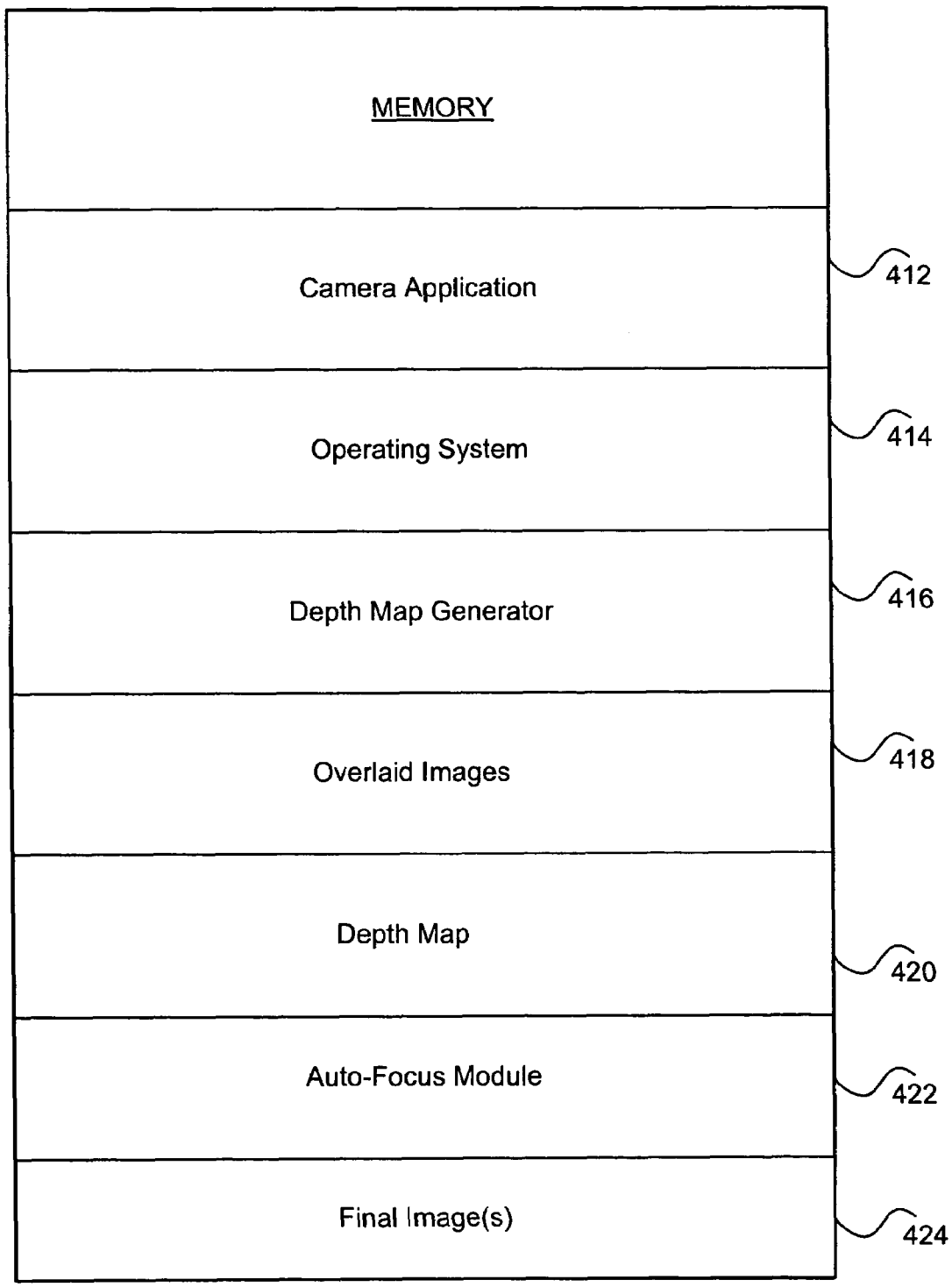
FIG. 4 is a block diagram for one embodiment of the memory of FIG. 3, in accordance with the present invention.

Referring now to FIG. 4, a block diagram for one embodiment of the FIG. 3 memory 346 is shown, in accordance with the present invention. In the FIG. 4 embodiment, memory 346 may include, but is not limited to, a camera application 412, an operating system 414, a depth map generator 416, overlaid images 418, a depth map 420, an auto-focus module 422, and one or more final image(s) 424. In alternate embodiments, memory 346 may readily include various other components in addition to, or instead of, those components discussed in conjunction with the FIG. 4 embodiment.

In the FIG. 4 embodiment, camera application 412 may include program instructions that are preferably executed by CPU 344 (FIG. 3) to perform various functions and operations for camera device 110. The particular nature and functionality of camera application 412 preferably varies depending upon factors such as the type and particular use of the corresponding camera device 110.

In the FIG. 4 embodiment, operating system 414 preferably controls and coordinates low-level functionality of camera device 110. In accordance with the present invention, depth map generator 416 may control and coordinate a depth map recovery procedure to generate a depth map 420 from overlaid images 418. In the FIG. 4 embodiment, depth map 420 may include a set of depth values that each represent a specific distance from camera device 110 to a particular point or area in a photographic target 112. The utilization of overlaid images 418 by depth map generator 416 to create a depth map 420 is further discussed below in conjunction with FIGS. 4-9. In the FIG. 4 embodiment, auto-focus module 422 may utilize depth map 420 to perform an auto-focus procedure before camera device 110 captures and stores one or more final image(s) 424.

Figure 5:
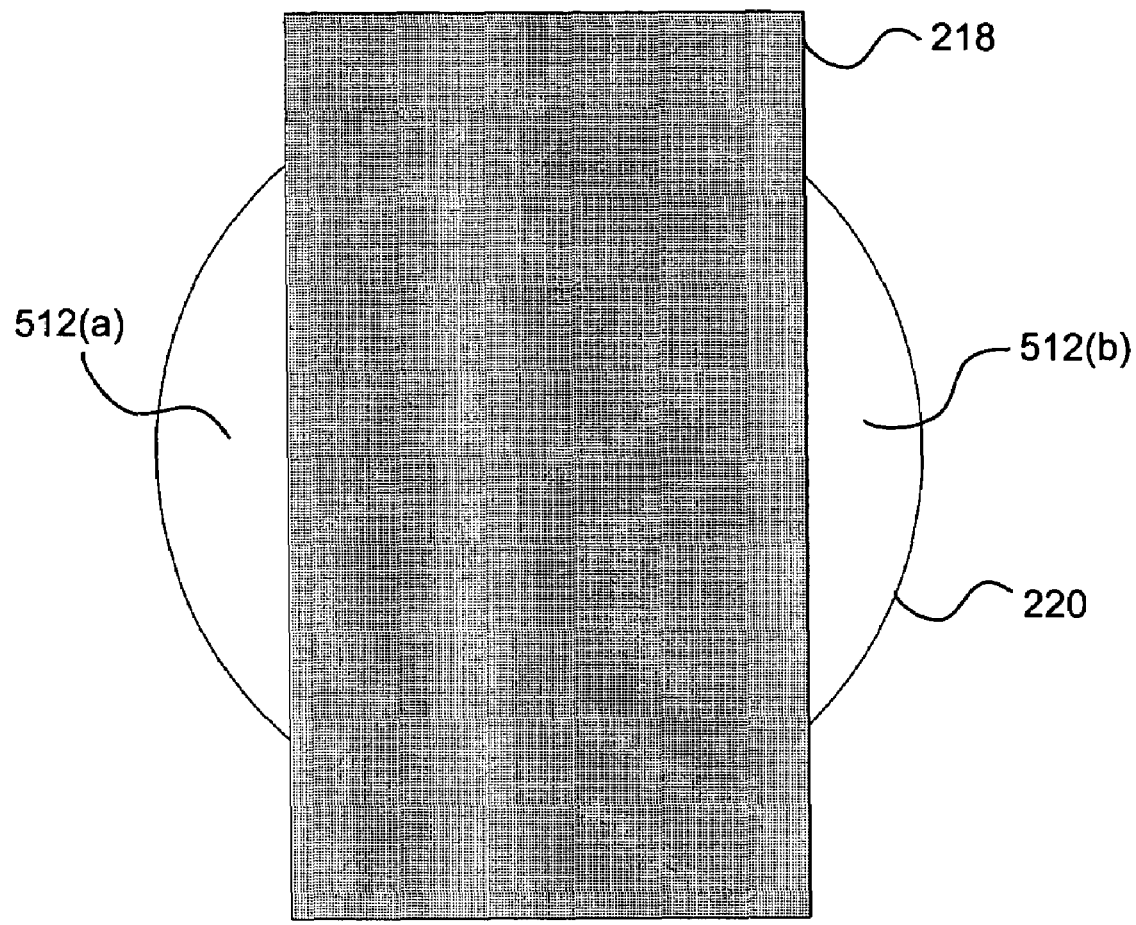
FIG. 5 is a frontal view for one embodiment of a single-lens stereo-shutter configuration, in accordance with the present invention.

Referring now to FIG. 5, a frontal view of a single-lens stereo-shutter configuration 510 is shown, in accordance with one embodiment of the present invention. The FIG. 5 single-lens stereo-shutter configuration 510 includes lens 220 and shutter 218 as shown above in the FIG. 2 capture subsystem 114. In alternate embodiments, the present invention may utilize various other configurations and elements to implement a single-lens stereo-shutter configuration 510.

In the FIG. 5 embodiment, after entering a depth map mode, depth map generator 416 may cause capture subsystem 114 of camera device 110 to position shutter 218 adjacent to lens 220 to thereby block the transmission of light through lens 220 to image sensor 224 (FIG. 2) except for light that passes through a first opening 512(*a*) and a second opening 512(*b*) where shutter 218 does not cover lens 220. The single-lens stereo-shutter configuration 510 therefore permits image sensor 224 of camera device 110 to simultaneously capture two overlaid images 418 (FIG. 4) of a photographic target 112 through respective corresponding openings 512(*a*) and 512(*b*).

The present invention may utilize other single-lens stereo-shutter configurations that are implemented in any effective manner to allow two separate overlaid images 418 to be captured by image sensor 224. For example, in alternate embodiments, shutter 218 may cover the entire surface of lens 220 with the exception of two round openings that are separated by a finite distance. The utilization of single-lens stereo-shutter configuration 510 is further discussed below in conjunction with FIGS. 6-9.

Figure 6A:
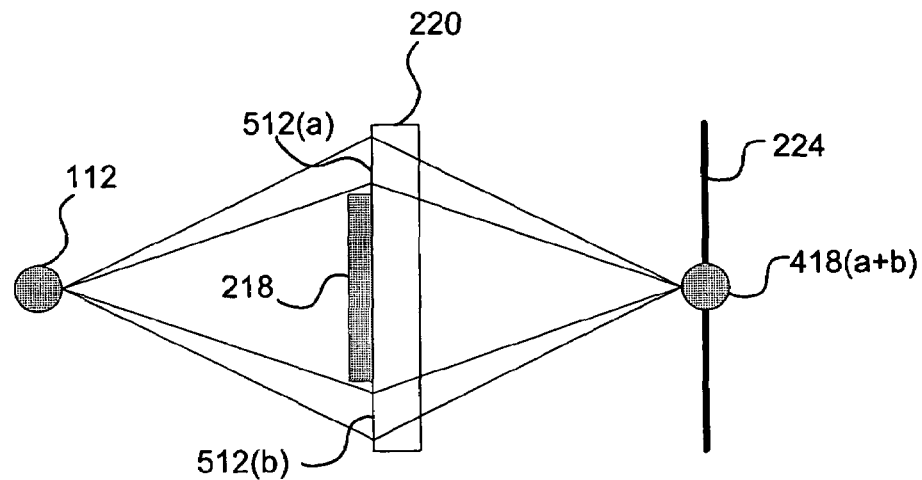
FIGS. 6A and 6B are plan views illustrating a disparity value, in accordance with one embodiment of the present invention.
Figure 6B:
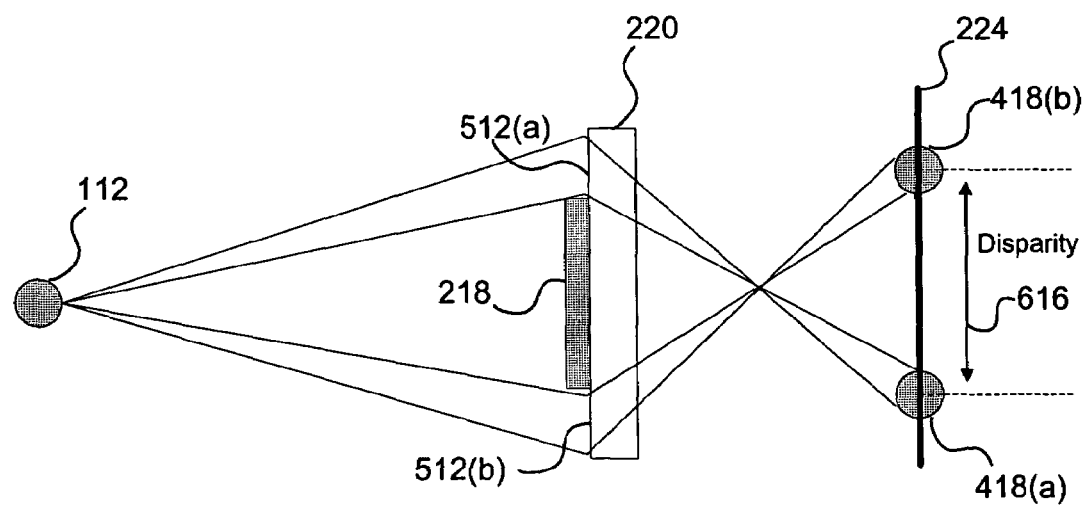

Referring now to FIGS. 6A and 6B, plan views illustrating a disparity value 616 are shown, in accordance with one embodiment of the present invention. The FIG. 6A and FIG. 6B embodiments are presented for purposes of illustration, and in alternate embodiments of the present invention, the present invention may determine disparity values by utilizing techniques other than those discussed in conjunction with the FIG. 6 embodiment.

In the FIG. 6A embodiment, lens 220 with shutter 218 is positioned to focus light reflected from target 112 onto image sensor 224 as overlaid images 418(a+b) without any disparity value or image separation. However, in the FIG. 6B embodiment, the distance from target 112 to lens 220 has been increased without changing the distance from lens 220 to image sensor 224. Therefore, in the FIG. 6B embodiment, a first overlaid image 418(a) is separated from a second overlaid image 418(b) by a disparity value 616. In accordance with the present invention, depth map generator 416 may determine disparity value 616 for then calculating a depth value that represents the distance of object 112 from lens 220. The calculation and utilization of disparity value 616 is further discussed below in conjunction with FIGS. 7-9.

Figure 7:
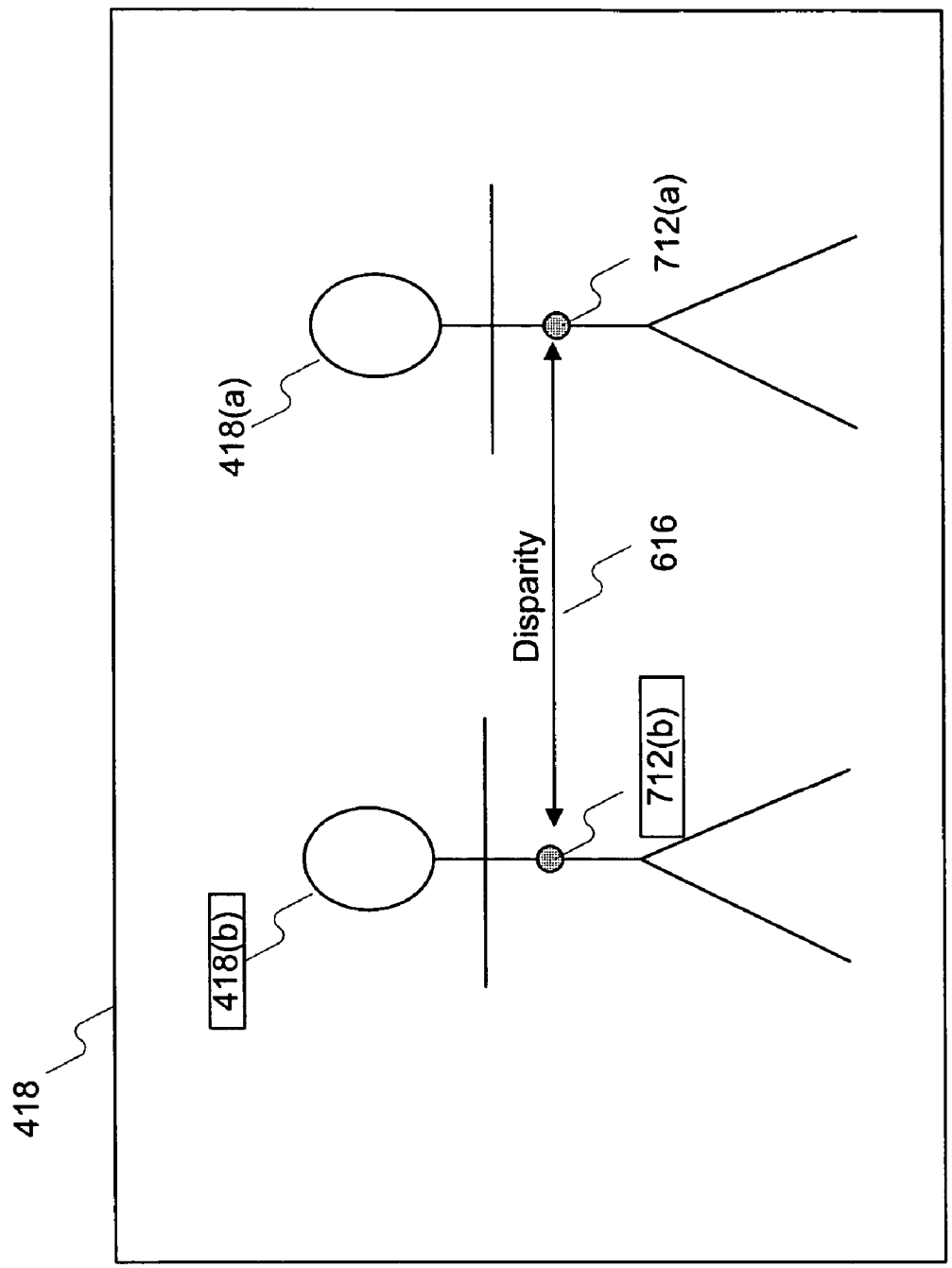
FIG. 7 is a diagram of the overlaid images of FIG. 4, in accordance with one embodiment of the present invention.

Referring now to FIG. 7, a diagram of one embodiment for the FIG. 4 overlaid images 418 is shown, in accordance with one embodiment of the present invention. The FIG. 7 embodiment is presented for purposes of illustration, and in alternate embodiments, overlaid images 418 may readily be implemented to include various configurations and elements in addition to, or instead of, certain of those configurations and elements discussed in conjunction with the FIG. 7 embodiment.

In the FIG. 7 embodiment, depth map generator 416 calculates disparity values for various corresponding matching points in overlaid images 418. For example, in the FIG. 7 embodiment, a first matching point 712(a) from overlaid image 418(a) corresponds to a second matching point 712(b) from overlaid image 418(b). Depth map generator 416 may determine disparity value 616 as the separation between matching point 712(a) and 712(b). Therefore, in order to determine a given disparity value 616, depth map generator 416 must establish the location of matching points 712 in overlaid images 418.

In the present invention, depth map generator 416 may utilize any effective and appropriate techniques to identify matching points 712 in overlaid images 418. For example, in certain embodiments, feature matching techniques may be utilized in which all pixel values are replaced by a value that characterizes their neighborhood (a so-called feature value). A search pixel whose feature value is closest to the feature value of a reference pixel is chosen as a candidate. An example of a feature value of a pixel is the local variance. Generalizing this method to multiple features leads to a method of feature vector matching.

In other embodiments, a correlation matching technique may be utilized in which a neighborhood around each pixel is enumerated as a sequence of pixel values. This is done in the same way for all pixels. A search pixel is chosen whose sequence most closely resembles the sequence of the reference pixel. In order to compare the two sequences, a rate of similarity between them is defined by means of cross correlation. In addition, in certain cases where epipolar geometry exists, an epipolar matching technique may be utilized in which a row of pixels is matched at the same time by utilizing an optimal correspondent subsequence algorithm. Determining disparity values 616 for use in calculating corresponding depth values to create a depth map 420 is further discussed below in conjunction with FIGS. 8-9.

Figure 8:
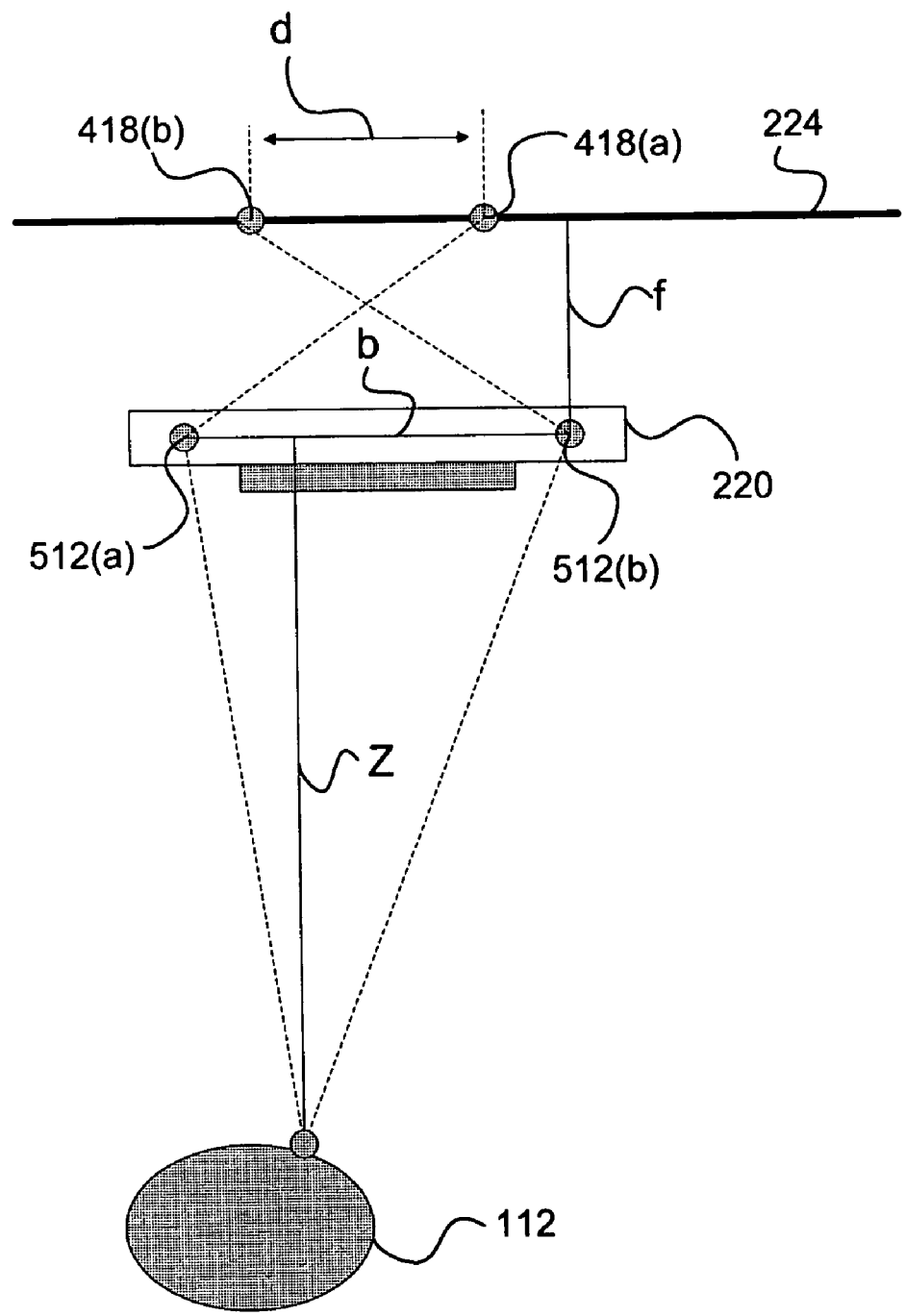
FIG. 8 is a plan view illustrating a calculation procedure for determining a depth value, in accordance with one embodiment of the present invention.

Referring now to FIG. 8, a plan view 810 illustrating a calculation procedure for determining a depth value is shown, in accordance with one embodiment of the present invention. The FIG. 8 embodiment is presented for purposes of illustration, and in alternate embodiments, the present invention may determine depth values by utilizing techniques other than those discussed in conjunction with the FIG. 8 embodiment.

In the FIG. 8 embodiment, depth map generator 416 may calculate a depth value "Z" that accurately represents the distance of a given point in photographic target 112 from lens 220. In the FIG. 8 embodiment, as discussed above, depth map generator 416 may determine a disparity value "d" to be equal to the separation between matching point 712(a) in overlaid image 418(a) and a corresponding matching point 712(b) in overlaid image 418(b). In addition, a baseline value "b" may be defined as the distance between the centers of first opening 512(a) and second opening 512(b) in single-lens stereo-shutter configuration 510 (FIG. 5). Finally, a focal length "f" may be defined as the distance between lens 220 and image sensor 224.

In accordance with one embodiment of the present invention, for pinhole openings 512(a) and 512(b), depth map generator 416 may then calculate depth value "Z" according to the following formula:

$$Z=(f*b)/(d-b)$$

where "d" is disparity value 616, "b" is a baseline value representing the distance between first opening 512(a) and second opening 512(b) of single-lens stereo-shutter configuration 510, and "f" is the focal distance from lens 220 to image sensor 224. The calculation and utilization of depth values are further discussed below in conjunction with FIG. 9.

Figure 9:
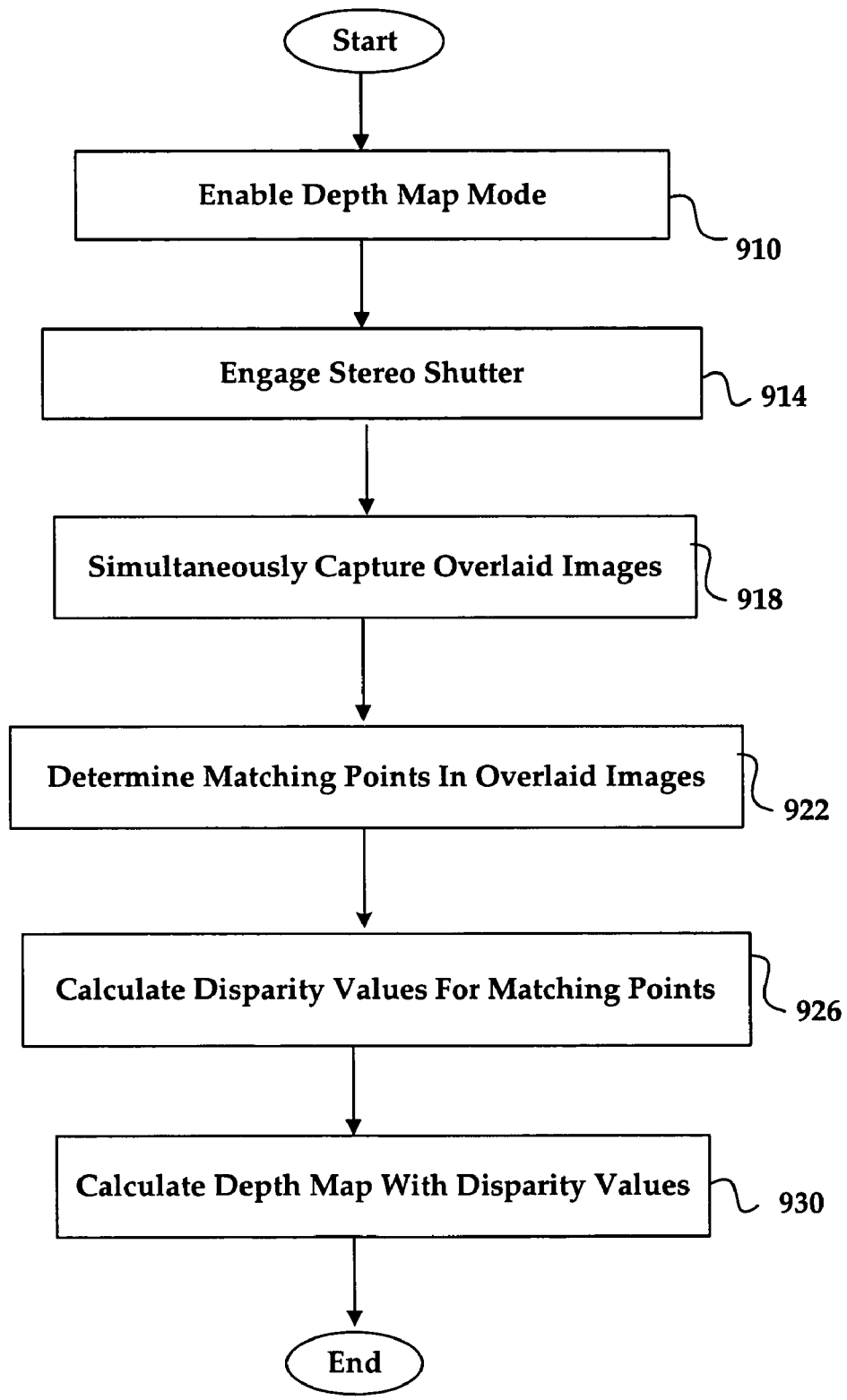
FIG. 9 is a flowchart of method steps for performing a depth map recovery procedure, in accordance with one embodiment of the present invention.

Referring now to FIG. 9, a flowchart of method steps for performing a depth map recovery procedure is shown, in accordance with one embodiment of the present invention. The FIG. 9 embodiment is presented for purposes of illustration, and in alternate embodiments, the present invention may readily utilize various other steps and sequences than those discussed in conjunction with the FIG. 9 embodiment.

In the FIG. 9 embodiment, in step 910, any appropriate entity may initially enable a depth map mode in camera device 110. In step 914, capture subsystem 114 of camera device 110 may responsively engage a single-lens stereo-shutter configuration 510 by utilizing any effective techniques. In step 918, camera device 110 may then simultaneously capture overlaid images 418 corresponding to a selected photographic target 112. Next, in step 922, a depth map generator 416 may perform a matching procedure to determine corresponding matching points 712 in the overlaid images 418.

In step 926, depth map generator 416 may calculate disparity values 616 corresponding to various pairs of matching points 712 in overlaid images 418. Finally, in step 930, depth map generator 416 may calculate individual depth values by utilizing said disparity values 616 to thereby define a depth map 420 corresponding to the selected photographic target 112. In certain embodiments, an autofocus module 422 may then utilize the depth map 420 to perform an auto-focus procedure before the camera device 110 captures and stores one or more final images 424.

In various alternate embodiments, depth map 420 may be utilized in any other appropriate and effective manner. For example, in certain embodiments of the present invention, depth map 420 may be utilized for various types of machine vision or object tracking applications. The present invention therefore provides an improved system and method for effectively and efficiently performing a depth map recovery procedure.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing a depth map recovery procedure, comprising:

an imaging device implemented with a single-lens stereo-shutter configuration for simultaneously capturing overlaid images corresponding to a photographic target; and a depth map generator configured to analyze said overlaid images to determine disparity values corresponding to separation distances between matching points in said overlaid images, said depth map generator entering a depth map mode to thereby activate said single-lens stereo-shutter configuration, an image sensor device simultaneously capturing said overlaid images through said single-lens stereo-shutter configuration, said depth map generator performing a matching procedure to identify multiple pairs of said matching points in said overlaid images, each of said multiple pairs of said matching points corresponding to a different specific location in said photographic target, said depth map generator determining said disparity values by calculating said separation distances between said multiple pairs of said matching points from said overlaid images, said depth map generator utilizing said disparity values to calculate corresponding ones of said depth values that each represents a physical distance from said single-lens stereo-shutter configuration to said different specific location in said photographic target, said depth map generator calculating each of said depth values according to a formula:

$$Z=(f*b)/(d-b)$$

where said Z is said depth value, said d is said disparity value, said b is a baseline value representing a baseline distance between a first opening and a second opening in said single-lens stereo-shutter configuration, and said f is a focal distance from said single-lens stereo-shutter configuration to said image sensor device.

2. A method for performing a depth map recovery procedure, comprising:

implementing an imaging device with a single-lens stereo-shutter configuration for simultaneously capturing overlaid images corresponding to a photographic target; and analyzing said overlaid images with a depth map generator to determine disparity values corresponding to separation distances between matching points in said overlaid images, said depth map generator entering a depth map mode to activate said single-lens stereo-shutter configuration, an image sensor device simultaneously capturing said overlaid images through said single-lens stereo-shutter configuration, said depth map generator performing a matching procedure to identify multiple pairs of said matching points in said overlaid images, each of said multiple pairs of said matching points corresponding to a different specific location in said photographic target, said depth map generator determining said disparity values by calculating said separation distances between said multiple pairs of said matching points from said overlaid images, said depth map generator utilizing said disparity values to calculate corresponding ones of said depth values that each represents a physical distance from said single-lens stereo-shutter configuration to said different specific location in said photographic target, said depth map generator calculating each of said depth values according to a formula:

$$Z=(f*b)/(d-b)$$

where said Z is said depth value, said d is said disparity value, said b is a baseline value representing a baseline distance between a first opening and a second opening in said single-lens stereo-shutter configuration, and said f is a focal distance from said single-lens stereo-shutter configuration to said image sensor device.

\* \* \* \* \*